United States Patent [19]
Mito et al.

[11] Patent Number: 5,627,862
[45] Date of Patent: May 6, 1997

[54] APPARATUS FOR DEMODULATING PHASE MODULATED WAVE

[75] Inventors: Kenji Mito; Manabu Honda, both of Tokorozawa, Japan

[73] Assignee: Pioneer Electronic Corporation, Tokyo, Japan

[21] Appl. No.: 597,612

[22] Filed: Feb. 6, 1996

[30] Foreign Application Priority Data

Feb. 7, 1995 [JP] Japan ................................ 7-019599

[51] Int. Cl.[6] .............................. H03D 3/22; H04L 27/22
[52] U.S. Cl. ............................................ 375/329; 329/304
[58] Field of Search .................................. 375/329, 279, 375/332; 455/205; 329/304, 310

[56] References Cited

U.S. PATENT DOCUMENTS 5,355,092 10/1994 Kosaka et al. ........................... 375/329
5,426,669 6/1995 Yamamoto et al. ..................... 375/324

Primary Examiner—Stephen Chin
Assistant Examiner—Betsy P. Lee
Attorney, Agent, or Firm—Perman & Green

[57] ABSTRACT

An apparatus for demodulating a phase modulation wave reduces an error rate of a demodulating circuit to perform a delay detection of an n-phase shift keying modulation wave without raising a clock frequency. When converting the received n-phase shift keying modulation wave into a rectangular wave, a waveform converting circuit for converting the n-phase shift keying modulation wave into a rectangular wave of a duty ratio which is larger or smaller than 50% is used. The rectangular wave is clocked through parallel registers of different lengths, outputs of the registers being operated on by exclusive-OR gates with the rectangular wave. Outputs of the gates are applied to respective one of a pair of counters, operated by a common clock signal, during periods of equality of outputs signals of the gates to provide a function of discriminating reproduction. A parallel/series converting circuit arranges upper bits and lower bits for reconstruction of each symbol of an original data message.

10 Claims, 7 Drawing Sheets

APPARATUS FOR DEMODULATING PHASE MODULATED WAVE

BACKGROUND OF THE INVENTION

1. Field of the Invention

The invention relates to an apparatus for demodulating an n-phase shift keying modulated wave carrying a digital signal.

2. Related Background Art

As a modulation system for transmitting digital data, an amplitude shift keying modulation (ASK) system, a phase shift keying modulation (PSK) system, a frequency shift keying modulation (FSK) system, and the like are known in the art.

When considering a multiplex transmission of a frequency modulated analog video signal and an audio signal, the phase shift keying modulations among the modulation systems are widely used in view of their features that a band limitation upon transmission can be performed, an interference to the other signals hardly occurs, a signal-to-noise ratio is good, and the like. In the PSK modulation systems, quadrature phase shift keying modulation (QPSK) system has a highest efficiency. According to the QPSK modulation wave, since a phase amplitude change is steep, a delay detecting circuit in a decoding apparatus of recording/reproduction modulation waves can be easily realized as a digital circuit. The QPSK modulation system for recording and reproducing a digital signal is, therefore, used in an information recording and reproducing apparatus disclosed in, for example, Japanese Patent Application No. 5-291071.

The QPSK modulation system disclosed in the Japanese Patent Application No. 5-291071 will now be described.

It is now assumed that base band data to be transmitted is as follows. That is, base band data "00 01 10 11 11 00 10 01" is assumed to be transmitted. Redundancy bits which indicate various information and is used for correction of a bit error and sync data bits for synchronization are generally included in the base band data. There is also a case where some ID data bits are further included.

The base band data is not modulated as it is, but is subjected to an addition of modulo 4 accumulatively by processing two bits as one unit for the sake of convenience of demodulation, thereby obtaining the following data. Consequently, 00 01 00 11 00 00 10 00 is obtained. If this data sequence is expressed as an (I, Q) data sequence and odd-number designated bits are expressed as I bits and even-number designated bits are expressed as Q bits, the original base band data is converted to the I bit sequence and the Q bit sequence, respectively. The I bit sequence and Q bit sequence, namely, I data and Q data are respectively supplied to an I input and a Q input in the QPSK modulator shown in FIG. 1.

A carrier signal fc (=2.88 MHz) is supplied to a carrier input terminal. The I data and Q data are transmitted through low pass filters 1 and 2, and are supplied to modulation signal input terminals of modulators 3 and 4, respectively. The carrier signal is supplied as it is to a modulated signal input terminal of the modulator 3. The carrier signal is delayed in phase by π/2 by a delay circuit 5, and the delayed signal is subsequently supplied to a modulated signal input terminal of the modulator 4. For example, when the input data is equal to "0", the modulators 3 and 4 allow the carrier signal to pass as it is. When the input data is equal to "1", the modulators 3 and 4 invert the phase of the carrier signal. Outputs of the modulators 3 and 4 are added by an adder 6 and a QPSK modulated wave is generated.

As shown in FIG. 2, the phase of the QPSK modulation wave obtained as mentioned above is delayed by −π/4 with respect to the original carrier phase when (I, Q) are (0, 0). When (I, Q) are (1, 0), it is delayed by −3π/4. When (I, Q) are (1, 1), it is delayed by −5π/4. When (I, Q) are (0, 1), it is delayed by −7π/4. In other words, the carrier phases π/4, 3π/4, 5π/4, and 7π/4 correspond to the (I, Q) data, respectively.

The parts (a) and (b) of FIG. 3 respectively show an I data waveform and a Q data waveform which are transmitted through the low pass filters 1 and 2. The part (c) of FIG. 3 shows a waveform of the QPSK output. Two bits of the (I, Q) data are referred to as one symbol, a transfer rate of a symbol train is set to 288 ksymbols/sec, and this corresponds to ten waves of the carrier having the frequency 2.88 MHz. The QPSK modulation wave which is obtained in such a manner as mentioned above is recorded to a recording medium or is transmitted by a proper transmission medium such as an RF channel or the like.

It is known that the modulator shown in FIG. 1 is realized by a method whereby the carrier waveforms of four phases, namely, the QPSK modulation waveform data is previously stored as a data table in a ROM and the carrier waveform data of the phase corresponding to the (I, Q) data that is derived on the basis of the original base band data is read out from the ROM and then processed by a D/A conversion. A circuit construction to execute the method is disclosed in FIG. 5 of Japanese reference 5-291071 and the corresponding description of the specification of Japanese Patent Application No. 5-291071.

In the case of demodulating the QPSK modulation wave, for example, a system for delaying and detecting the QPSK modulation wave and demodulating it is used. In the delay detecting system, although there is a possibility that an error occurs in the delay detection due to a waveform distortion of the QPSK modulated wave or a variation in rotational speed of an optical disk or the like, what is called an error rate has to be reduced.

To reduce the error rate in the delay detection of the QPSK modulated wave, a method of raising a sampling frequency in the delay detection is conceivable. The use of this method would result in an enlargement in scale of the circuit for the delay detection and an increase in electric power consumption.

OBJECT AND SUMMARY OF THE INVENTION

It is, therefore, an object of the invention to provide a demodulating apparatus for demodulating a QPSK modulated wave at a low error rate without increasing both of a circuit scale and an electric power consumption.

According to the invention, the object is accomplished by a demodulating apparatus in a transmission system in which an n-phase (n≧2) shift keying modulated wave carrying information is transmitted by changing a phase of a carrier signal by a predetermined amount on the basis of an original base band digital data and is demodulated, the invention comprising: wavelength converting means for converting the transmitted n-phase shift keying modulated wave to a rectangular wave; latching means for latching the rectangular wave by a clock pulse of a frequency that is an integer multiple of the carrier signal frequency and forming a latch output; delay means for delaying the latch output and forming the latch component which is delayed by a time corresponding to one time slot; phase difference detecting means for detecting a phase difference between the latch output and an output signal from the delay means; and means for extracting the digital data on the basis of the detected phase difference, wherein the waveform converting means converts the modulated wave to a rectangular wave of a deviated duty ratio which is larger or smaller than 50%.

DETAILED DESCRIPTION OF THE PREFERRED EMBODIMENT

Figure 1:
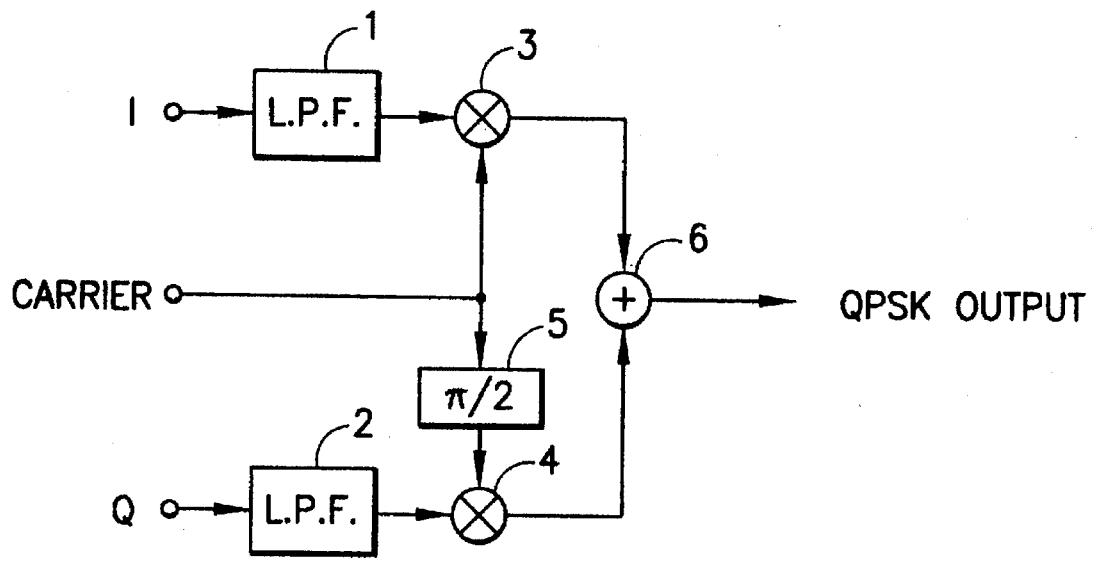
FIGS. 1 and 2 are diagrams showing a principle of a quadrature phase shift keying (QPSK) modulated system.
Figure 2:
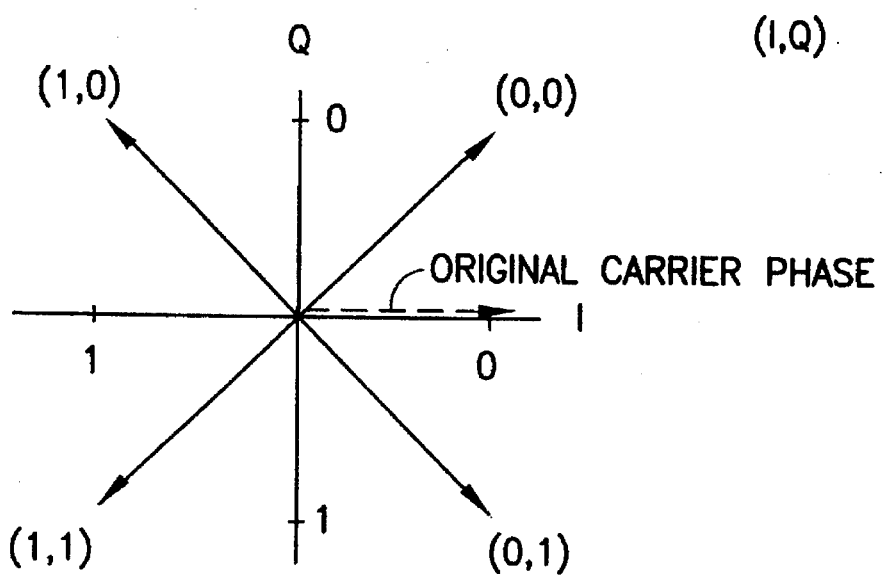
Figure 3:
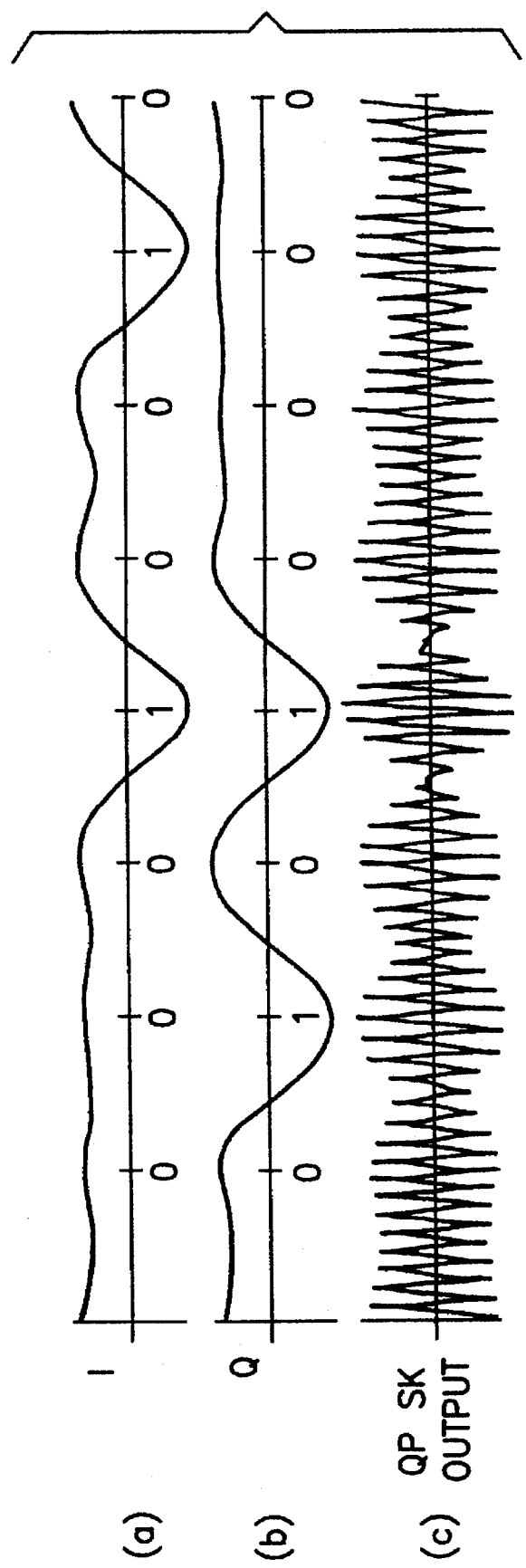
FIG. 3 is a waveform diagram showing the relation between (I, Q) data which is formed in the QPSK modulated and a QPSK modulated wave.
Figure 4:
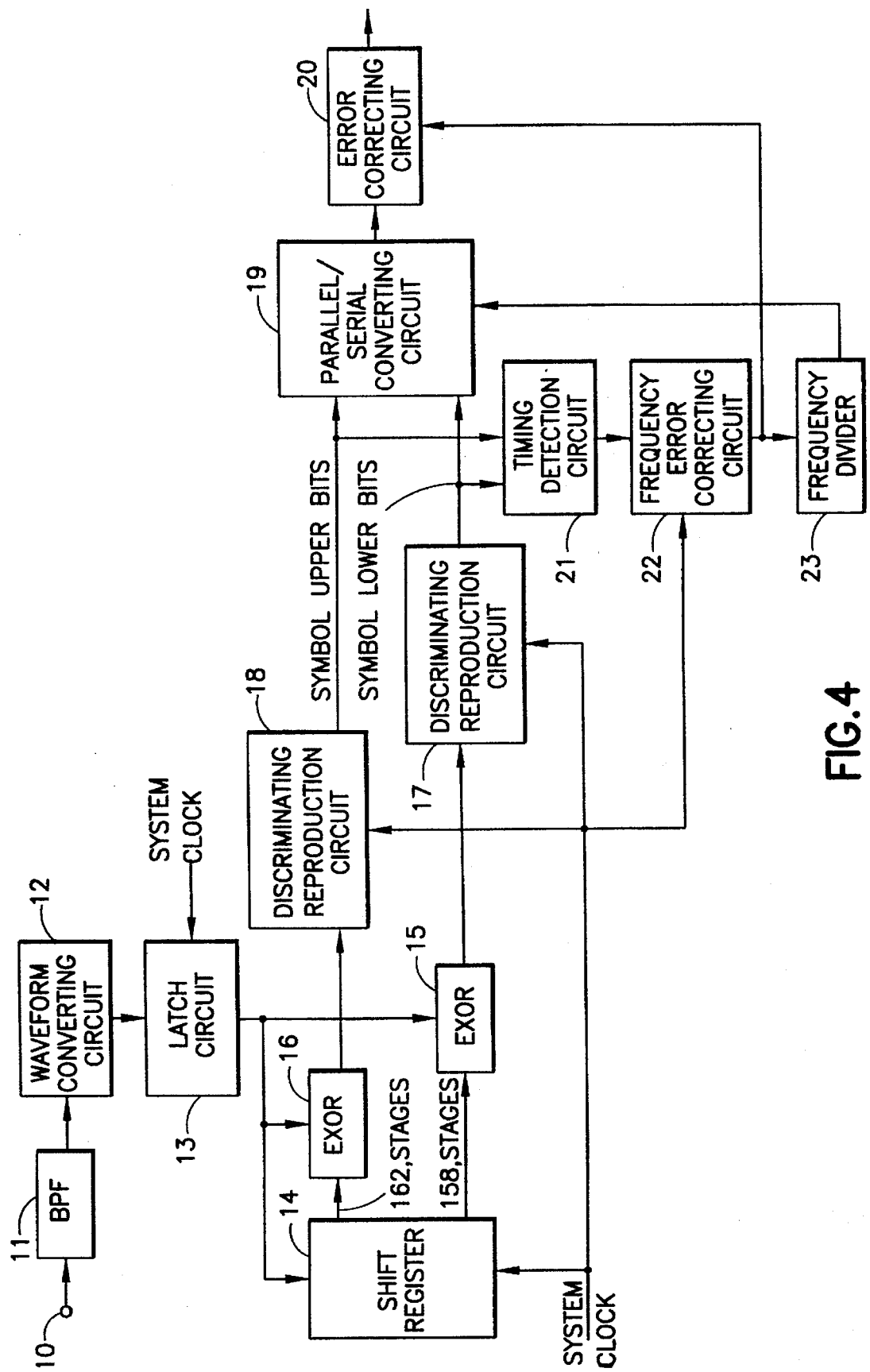
FIG. 4 is a block diagram showing a demodulating apparatus according to the invention.

A demodulating apparatus of a QPSK modulated wave according to an embodiment of the present invention will now be described with reference to FIG. 4 and subsequent drawings.

First, the QPSK modulated wave which has been read out from a recording medium such as an optical disk or the like or has been transmitted through an RF channel is supplied to a band pass filter 11 having a predetermined pass band through an input terminal 10. The pass band of the band pass filter 11 has a center frequency which is equal to a carrier frequency fc (for example, 2.88 MHz) of the QPSK modulated wave. The QPSK modulated wave transmitted through the band pass filter 11 is supplied to a waveform converting circuit 12. The waveform converting circuit 12 converts the QPSK modulated wave to each rectangular wave.

Now, assuming that a time interval corresponding to one symbol is called one time slot, a rectangular wave output of the waveform converting circuit 12 includes, for example, ten rectangular waves in each time slot. The first to fourth quadrants to which the phases of the group of rectangular waves for each time slot belong correspond to (0, 0) (1, 0) (1, 1) (0, 1) of (I, Q) data, respectively.

The rectangular wave output of the waveform converting circuit 12 is latched to "0" or "1" by a latch circuit 13 on the basis of a fixed system clock fck which is unique to a demodulating circuit of, for example, 46.08 MHz. A latch output of the latch circuit 13 is supplied to an input terminal of a shift register 14. The shift register 14 generates a delay output of 158 stages and a delay output of 162 stages in accordance with the system clock fck. Those delay outputs are supplied to exclusive OR gates 15 and 16, respectively. Each of the exclusive OR gates 15 and 16 generates an exclusive OR between the delay output being supplied and the latch output of the latch circuit 13. Outputs of the exclusive OR gates 15 and 16 are supplied to discriminating reproduction circuits 17 and 18, respectively.

The discriminating reproduction circuits 17 and 18 can be constructed by, for example, counters which receive the system clock fck as a clock input and count up so long as outputs of the gates 15 and 16 are equal to "1" and each of which generates "0" when a count value is equal to or less than 8 and generates "1" when the count value is equal to or larger than 9.

Therefore, logic outputs ($d_{17}$, $d_{18}$) of the discriminating reproduction circuits 17 and 18 correspond to two bits of an original digital data sequence before an addition of modulo 4. The parallel data ($d_{17}$, $d_{18}$) of every two bits which is obtained as mentioned above is converted to serial reproduction digital data by a parallel/serial converting circuit 19. The reproduction digital data is subjected to an error correcting process in an error correcting circuit 20.

A timing detection circuit 21 extracts a timing signal from the parallel data ($d_{17}$, $d_{18}$). A frequency error correcting circuit 22 supplies an error correction pulse signal of 9.216 MHz whose frequency has been corrected in accordance with the derived timing signal and the system clock to the error correcting circuit 20. The error correction pulse signal is frequency divided by a frequency divider 23, forming a pulse signal of 576 kHz, and the latter signal is supplied to the P/S converting circuit 19.

Figure 5:
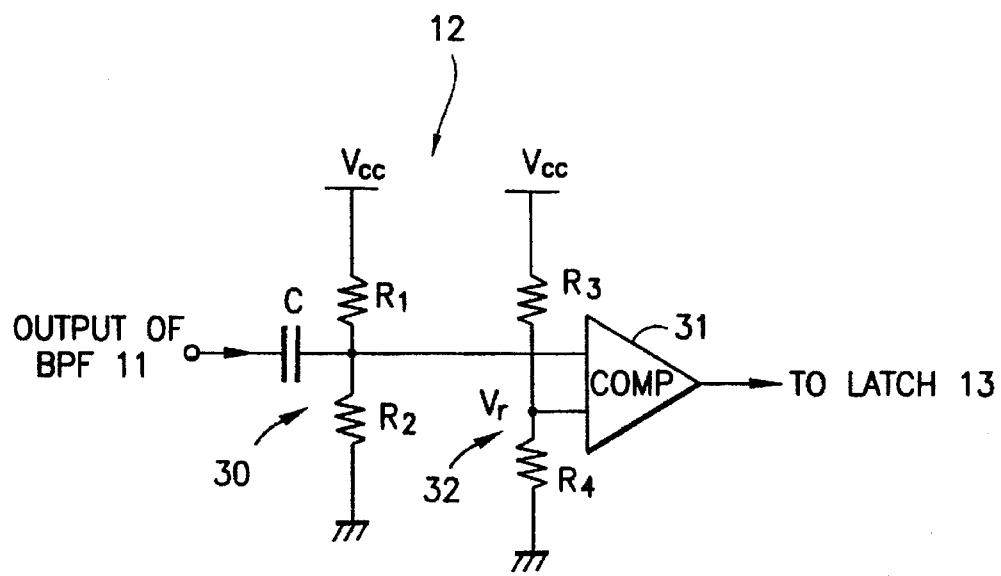
FIG. 5 is a circuit diagram showing a specific circuit example of a waveform converting circuit 12 in the demodulating apparatus of FIG. 4.

FIG. 5 shows a specific circuit example of the QPSK modulated wave transmitted through the BPF 11 passes through a DC-cut off capacitor C and is supplied to a level shifting circuit 30 comprising resistors R1 and R2 having an equal resistance value. A signal transmitted through the level shifting circuit 30 is supplied to one input of a comparator 31. A reference potential Vr from a reference setting circuit 32 comprising resistors R3 and R4 is supplied to the other input of the comparator 31. A ratio R3/R4 of the resistances R3 and R4 is set to "1+cos7.5π/16:1−cos7.5π/16" or "1+cos8.5π/16:1−cos8.5π/16" so that a duty ratio of the rectangular wave outputs is equal to, for example, (8.5:7.5).

The adjustment of the duty ratio is performed so as to obtain a rectangular wave output of a duty ratio which is deviated from the duty ratio of 50% by a value that is an odd-number multiple of the half of the number obtained by dividing the frequency fc of the rectangular wave by the clock frequency fck, for each period of the clock frequency fck at which the rectangular wave output of the waveform converting circuit 12 is latched. Namely, the duty ratio is deviated by (fc/2fck)·(2n+1), in which n is an integer of 0 or more. The duty ratio of the rectangular wave output of the waveform converting circuit 12 is, accordingly, equal to ½+(fc/2fck)·(2n+1)

For example, assuming that fc=2.88 MHz and fck=46.08 MHz, the duty ratio of the rectangular wave output of the waveform converting circuit 12 is greater than 50% by (1/32)×(2n+1). When n=0, the duty ratio is equal to 17/32(= 8.5/16).

Figure 6:
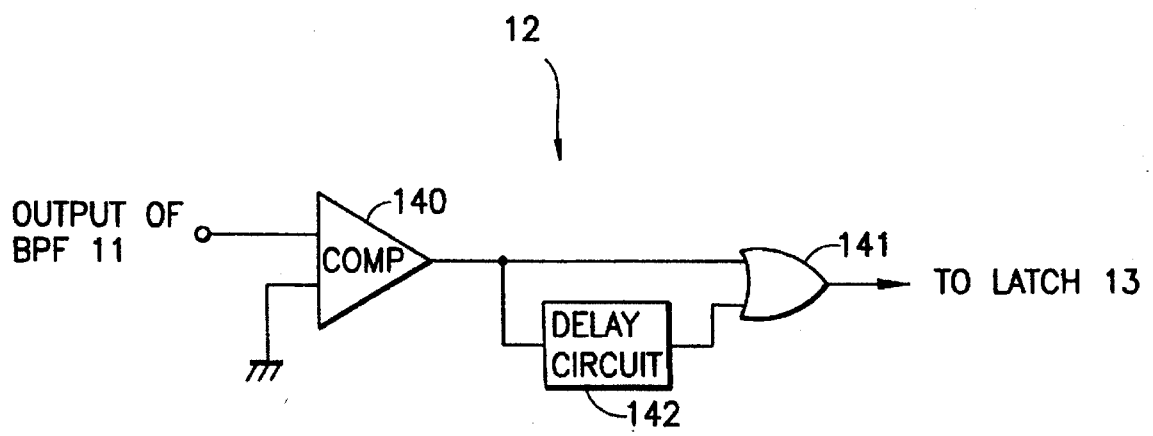
FIG. 6 is a circuit diagram showing a specific circuit example of the waveform converting circuit 12 in the demodulating apparatus of FIG. 4.

FIG. 6 shows another specific example of the waveform converting circuit 12. Namely, the output of the BPF 11 is supplied to one input terminal of a comparator 140 and the other input terminal is connected to the ground. When a waveform of the QPSK modulated wave is positive, the comparator 140 generates a "1". In other words, the comparator 140 generates a rectangular wave of a duty ratio of 50%. An output of the comparator 140 is supplied to an input of an OR gate 141 and is also supplied to a delay circuit 142. The delay circuit 142 delays the input pulse by a time Δt (=½fck(2n+1) ) corresponding to (fc/2fck)·(2n+1).

Therefore, an output of the OR gate 141 has a waveform in which the duty ratio is deviated from 50% by (fc/2fck)·(2n+1).

As mentioned above, when the QPSK modulated wave according to the invention is waveform converted into a rectangular wave, a rectangular wave of the duty ratio of 50% is not generated, but the QPSK modulated wave is converted to a rectangular wave that is deviated from 50% by the value of an odd-number multiple of the half of the interval of the latch pulses (system clock of 46.08 MHz in the embodiment). A symbol error ratio, consequently, in the delay detection which is performed by the shift register 14, exclusive OR gates 15 and 16, and discriminating reproduction circuits 17 and 18 can be reduced.

The reasons why the operation and effect mentioned above will now be described.

Figure 7:
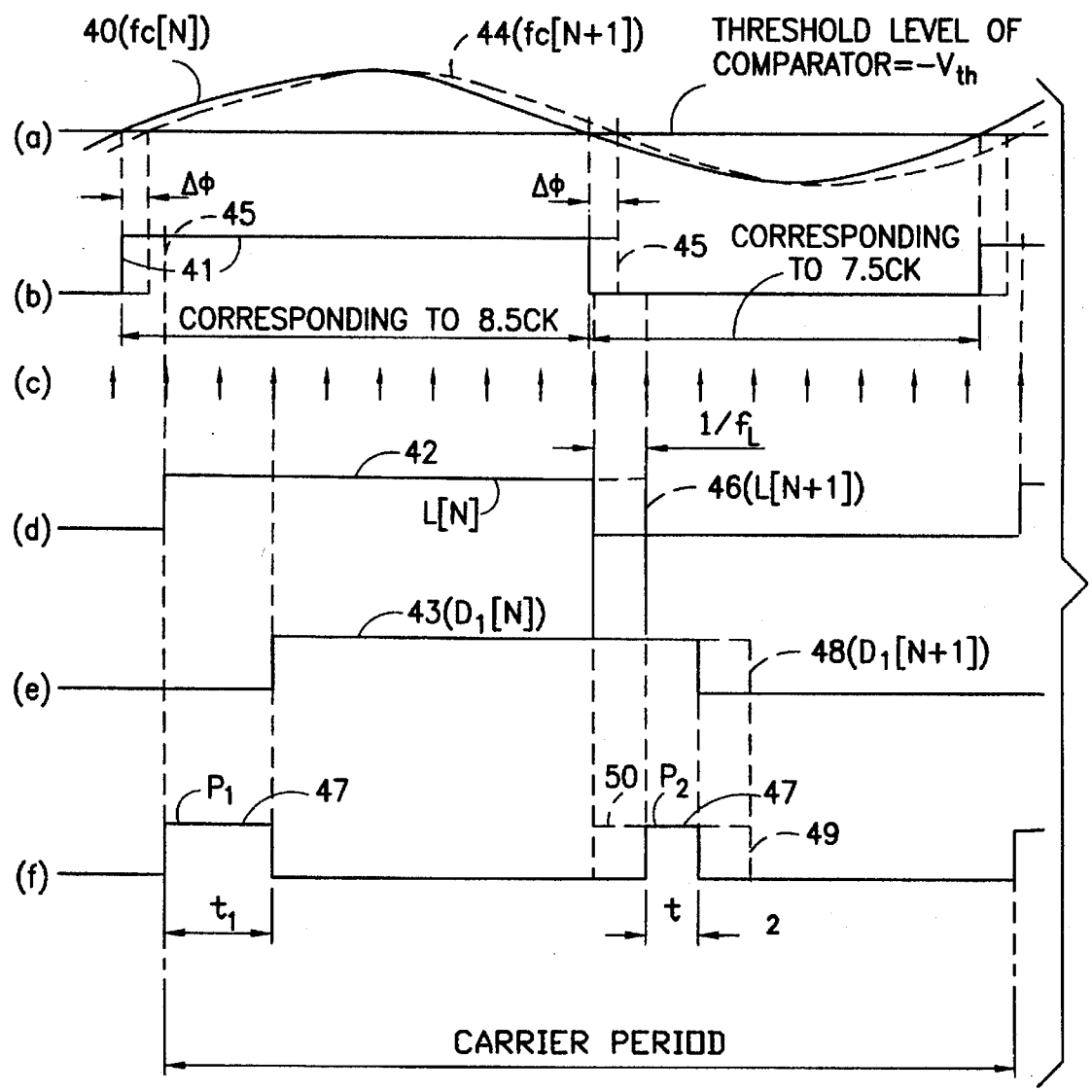
FIG. 7 is a waveform diagram showing signal waveforms appearing in the demodulating apparatus of FIG. 4 using the waveform converting circuit of FIG. 5.

First, when a QPSK modulated wave shown by a solid line waveform 40 shown in the part (a) of FIG. 7 is supplied, one sine waveform fc[N] in the Nth time slot of QPSK modulated wave is converted to the rectangular waveform shown by a solid line 41 in the part (b) of FIG. 7 by the waveform converting circuit 12. In this case, since a threshold level of the waveform converting circuit 12 is equal to $-V_{th}$, the duty ratio of the rectangular wave shown in the part (b) of FIG. 7 is equal to or larger than 50% and is equal to, for example, $^{8.5}/_{16} \times 100\%$. The latch circuit 13 latches the rectangular wave at a timing shown by an arrow in the part (c) of FIG. 7 by the system clock, thereby forming a latch output L[N] shown by a solid line waveform 42 in the part (d) of FIG. 7. An output of the latch circuit 13 is delayed by the shift register 14 and a delay output D[N] such that an output of 162 stages is as shown by a solid line waveform 43 in the part (e) of FIG. 7 is obtained.

Now assuming that one carrier period is equal to 16 periods of clock fck, since a delay output D1 [N] is delayed from the waveform L[N] by a length (T+2/fck) of one time slot, the exclusive OR gate 16 gets the exclusive OR between D1 [N] and a latch output L[N+1] of the rectangular wave corresponding to a modulated wave fc[N+1] in (N+1) th time slot and output it.

When it is now assumed that, for example, the QPSK modulated wave is read out from the optical disk and fc[N+1] is phase shifted from fc[N] by ΔΦ due to an eccentricity jitter or the like of the optical disk, a waveform of fc[N+1] is shown by a broken line waveform 44 in the part (a) of FIG. 7. The rectangular wave output of the waveform converting circuit 12 has a waveform as shown by a broken line waveform 45 in the part (b) of FIG. 7. When the signal of the waveform 45 is latched into the latch circuit 13 by the clock pulse in the part (c) of FIG. 7, the latch output L[N+1] having a waveform shown by a broken line waveform 46 is derived.

The exclusive OR output between the latch output L[N+1] and the delay output D1 [N] is derived from the exclusive OR gate 16 and its waveform becomes a solid line waveform 47 including front and rear pulses P1 and P2.

A waveform of a delay output D1 [N+1] corresponding to the latch output L[N+1] is shown by a broken line waveform 48 in the part (e) of FIG. 7. A trailing edge, therefore, of the rear pulse P2 of the output of the OR gate 16 corresponding to the delay output D1 [N+1] is shown by a broken line 49. A leading edge of the rear pulse P2, however, is determined by a trailing edge of a latch output L[N+2] appearing in a further next time slot (N+2). The leading edge of the rear pulse P2 is, consequently, shown by a broken line 50 in the part (f) of FIG. 7 when a leading edge of L[N+2] is expressed by the solid line 42 in the part (d) of FIG. 7. When it is expressed by the broken line 46 in the part (d) of FIG. 7, the leading edge of the rear pulse P2 is shown by the solid line 47 in the part (f) of FIG. 7.

The discriminating reproduction circuit 17 counts a period of time of "1" in an output of the OR gate 15, namely, a total period (t1+t2) of pulse widths t1 and t2 of the pulses P1 and P2. A count value lies within a range from 0 to 16. This is because since there are not only a case where t1=t2 but also a case where t1 =t2± 1/fck, (t1+t2) is expressed by seventeen kinds of count values.

In other words, in the demodulating apparatus according to the invention, a phase shift amount of fc[N] can be discriminated by seventeen gradations, namely, it corresponds to about 26.4 dB as a C/N conversion value.

Figure 8:
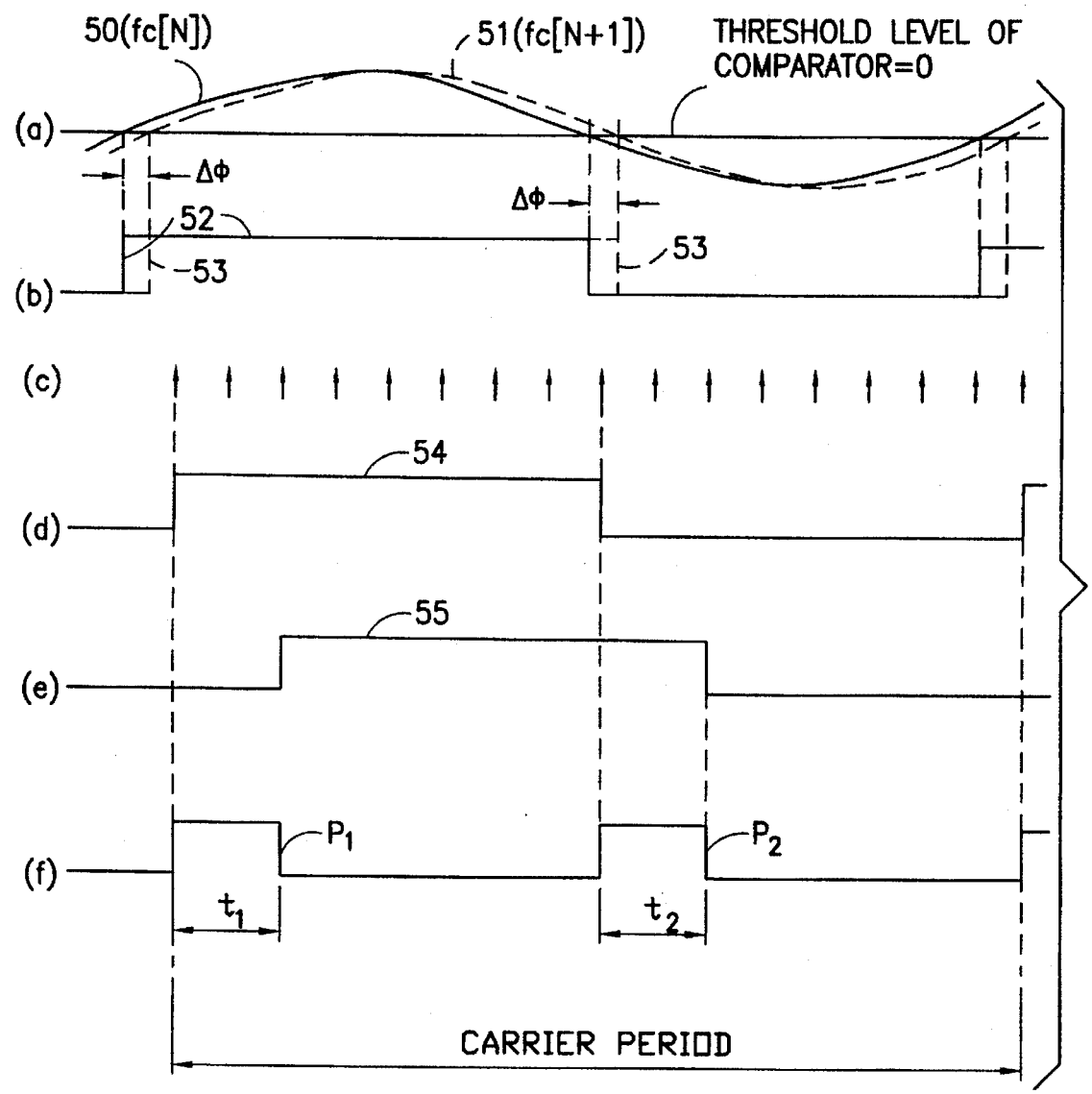
FIG. 8 is a waveform diagram showing signal waveforms appearing in a demodulating apparatus of a prior art.

FIG. 8 shows signal waveforms in a prior art in the case where the waveform converting circuit 12 slices the QPSK modulated wave fc[N] by 0 level and converts into the rectangular wave of a duty ratio of 50%.

That is, now assuming that, for example, the carrier waveform fc[N] of the QPSK modulated wave of the time slot N as shown by the solid line 50 in the part (a) of FIG. 8 was phase shifted to a carrier waveform fc[N+1] as shown by a broken line 51, the rectangular waveform which is converted by the waveform converting circuit has a waveform as shown by a solid line waveform 52 and a broken line waveform 53 in the part (b) of FIG. 8.

When the rectangular waveforms 52 and 53 are latched by the system clock fck at timings shown in the part (c) of FIG. 8, their latch outputs have the same waveform as shown by a solid line 54 as shown in the part (d) of FIG. 8. This is because the duty ratios of the rectangular waves 52 and 53 are equal to 50% and a frequency ratio of fc and fck, namely, fc is equal to a ratio of an integer value (16 in this case).

Therefore, even in the output of 162 stages of the shift register 14 which is expressed by a solid line waveform 55 in the part (e) of FIG. 8, an influence by the phase shift ΔΦ between the time slots at fc doesn't appear.

The pulse widths t1 and t2, therefore, of the pulses P1 and P2 corresponding to the phase difference between the time slots in the output from the exclusive OR gate 15 are equal. There are, consequently, only nine kinds (0, 2, 4, 6, 8, . . . , 16) of changes in (t1+t2). Namely, there are nine gradations in the judgment by the discriminating reproduction circuit 17 and they correspond to about 20.9 dB as a C/N conversion value, so that precision of detection is insufficient.

Figure 9:
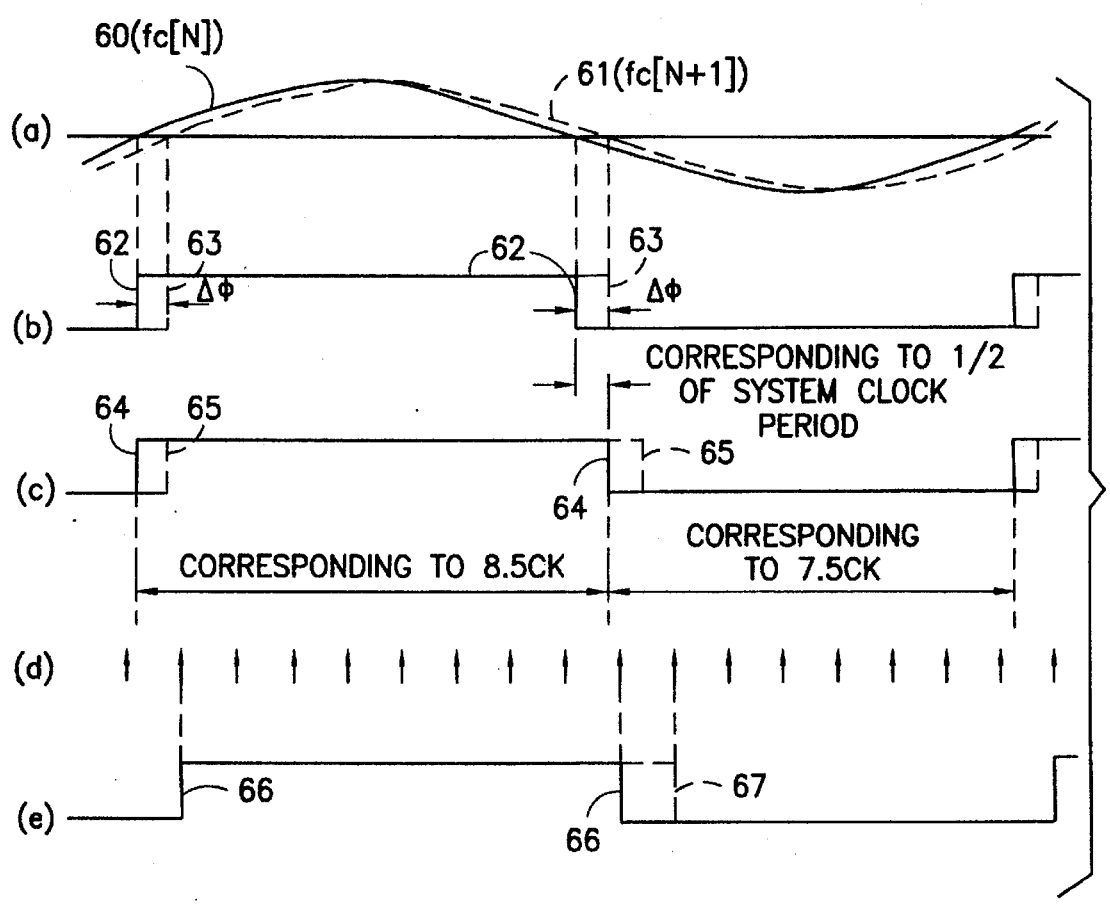
FIG. 9 is a waveform diagram showing signal waveform appearing in the demodulating apparatus of FIG. 4 using the waveform converting circuit shown in FIG. 6.

FIG. 9 is a waveform diagram showing signal waveforms in the case where a rectangular wave of a duty ratio larger than 50% is obtained in the waveform converting circuit 12 shown in FIG. 6.

Namely, assuming that the carrier waveforms fc[N] and fc[N+1] of the time slots N and N+1 are shown by a solid line waveform 60 and a broken line waveform 61 in the part (a) of FIG. 9, an output waveform of the comparator 140 is as shown by a solid line waveform 62 and a broken line waveform 63 in the part (b) of FIG. 9. An output of the OR gate 141 has a waveform of a duty ratio of $^{8.5}/_{16}$ as shown by a solid line waveform 64 and a broken line waveform 65 in the part (c) of FIG. 9, respectively.

When the waveforms 64 and 65 in the part (c) of FIG. 9 are latched by the system clock in the part (d) of FIG. 9, they are as shown by a solid line waveform 66 and a broken line waveform 67 in the part (e) of FIG. 9. The phase difference ΔΦ between fc[N] and fc[N+1] appears as a change of one clock of the latch output. The latch output, therefore, has seventeen gradations and it will be understood that the operation and effect which are similar to those in the case of the specific example of the waveform converting circuit 12 shown in FIG. 5 are obtained.

In brief, the QPSK modulated wave is obtained by QPSK modulating the carrier signal fc by the (I, Q) data which is obtained by sequentially modulo 4 adding two bits (one symbol) for each time slot of the original base band digital data on a symbol unit basis and is transmitted. When the QPSK modulated wave is subsequently demodulated by the delay detecting system, the received QPSK modulated wave is converted to the rectangular wave of a duty ratio that is larger or smaller than 50%. The resultant rectangular wave is latched by the clock pulse which is an integer multiple of the frequency fc of the carrier signal and is asynchronous with fc. The delay detection is performed to the resultant latch output.

Although the embodiment has been shown and described with respect to the example of the QPSK modulated wave, the invention is not limited to this example. The invention is effective in case of delaying and detecting the n-phase shift keying modulated wave (n is an integer of 2 or more).

In the embodiment, the delay detection has been performed for each time slot. The delay detection, however, can be also executed every several time slots in consideration of an external disturbance such as fading or the like.

In the demodulating apparatus of the n-phase shift keying modulated wave according to the invention, when the phase information which the received modulated wave has is detected by the delay detecting system, the modulated wave is converted to the rectangular wave of a duty ratio which is larger or smaller than 50% and is latched by the clock pulse of a frequency that is an integer (m) multiple of the carrier component of the modulated wave, and the delay detection is performed with respect to the resultant rectangular wave. There are, consequently, (m+1) kinds of phase information which the latch output has and the error rate can be reduced.

What is claimed is:

1. A demodulating apparatus in a transmission system in which an n-phase (n≧2) shift keying modulated wave carrying information is transmitted by changing a phase of a carrier signal by a predetermined amount on the basis of original base band digital data and is demodulated, comprising:

waveform converting means for converting a transmitted n-phase shift keying modulated wave into a rectangular wave;

latch means for latching said rectangular wave by a clock pulse of a frequency which is substantially equal to an integer multiple of said carrier signal, thereby forming a latch output;

delay means for delaying said latch output, thereby forming a latch component which is delayed by a time corresponding to a predetermined number of time slots;

phase difference detecting means for detecting a phase difference between said latch output and an output signal from said delay means; and means for extracting said digital data on the basis of said detected phase difference;

wherein said waveform converting means converts said n-phase shift keying modulated wave into a rectangular wave of a deviated duty ratio that is offset from a 50% duty ratio.

2. An apparatus according to claim 1, wherein said waveform converting means comprises:

a comparator for generating a "1" when said n-phase shift keying modulated wave exceeds a threshold value which is deviated from a predetermined DC potential by a deviation potential amount corresponding to said predetermined amount.

3. An apparatus according to claim 1, wherein said waveform converting means comprises:

a comparator for outputting a signal having a value "1" or "0", the comparator output value of "1" being obtained upon said modulated wave being positive, and the comparator output value of "0" being obtained upon said modulated wave being negative.

4. An apparatus according to claim 1, wherein said deviated duty ratio is deviated from 50% by a deviation amount of an odd-number multiple of a half period of said clock pulse.

5. An apparatus according to claim 1, wherein said integer multiple is an even-number multiple of the frequency of said carrier signal.

6. A modulating apparatus in a transmission system in which two bits (one symbol) for each time slot of original base band digital data are sequentially modulo 4 added on a symbol unit basis and a carrier signal is QPSK modulated and a resultant QPSK modulated wave is transmitted and demodulated, comprising:

waveform converting means for converting said transmitted QPSK modulated wave and converting into a rectangular wave;

latch means for latching said rectangular wave by a clock pulse of a frequency which is substantially equal to an integer multiple of a frequency of said carrier signal, thereby forming a latch output;

delay means for delaying said latch output, thereby forming a latch component delayed by one time slot and phase latch components of an I axis and a Q axis;

exclusive- OR gates for obtaining the exclusive OR of each of said I axis latch component and said Q axis latch component and said latch output, thereby forming an upper bit phase difference pulse signal and a lower bit phase difference pulse signal;

first discriminating reproduction means for setting a logic value of lower bits to "0" upon occurrence of a count value which is smaller than a count value corresponding to the half of one period of said carrier signal, said logic value of lower bits being set to "1" upon occurrence of a count value which is larger than a count value corresponding to the half of said one period of said carrier signal, said logic value of said first discriminating reproduction means being obtained by counting a total pulse width in one period of said lower bit phase difference pulse signal by said clock pulse;

second discriminating reproduction means for setting a logic value of upper bits to "0" upon occurrence of a count value which is smaller than a count value corresponding to the half of said one period of said carrier signal, said logic value of lower bits being set to "1" upon an occurrence of a count value which is larger than a count value corresponding to the half of said one period of said carrier signal, said logic value of said second discriminating reproduction means being obtained by counting a total pulse width in one period of said upper bit phase difference pulse signal by said clock pulse; and parallel/serial converting means for serially arranging said upper bits and said lower bits, thereby reconstructing one symbol of said original base band data; and wherein said waveform converting means converts said QPSK modulated wave into a rectangular wave of a deviated duty ratio which is offset from a 50% duty ratio.

7. An apparatus according to claim 1 wherein the offset duty ratio is less than 50%.

8. An apparatus according to claim 1 wherein the offset duty ratio is greater than 50%.

9. An apparatus according to claim 6 wherein the offset duty ratio is less than 50%.

10. An apparatus according to claim 6 wherein the offset duty ratio is greater than 50%.

* * * * *

UNITED STATES PATENT AND TRADEMARK OFFICE
CERTIFICATE OF CORRECTION

PATENT NO. : 5,627,862
DATED : May 6, 1997
INVENTOR(S) : Mito et al.

It is certified that error appears in the above-identified patent and that said Letters Patent is hereby corrected as shown below:

In col. 8, claim 6, line 23, "modulating" should be --demodulating--.

Signed and Sealed this

Twenty-third Day of September, 1997

Attest:

BRUCE LEHMAN

Attesting Officer

Commissioner of Patents and Trademarks